(12) United States Patent
Frost

(10) Patent No.: US 11,503,927 B1
(45) Date of Patent: Nov. 22, 2022

(54) MERCHANDISER DEVICE AND METHOD

(71) Applicant: Mercade Frost, San Francisco, CA (US)

(72) Inventor: Mercade Frost, San Francisco, CA (US)

( * ) Notice: Subject to any disclaimer, the term of this patent is extended or adjusted under 35 U.S.C. 154(b) by 361 days.

(21) Appl. No.: 16/883,196

(22) Filed: May 26, 2020

(51) Int. Cl.
*A47F 13/08* (2006.01)

(52) U.S. Cl.
CPC ................... *A47F 13/08* (2013.01)

(58) Field of Classification Search
CPC .. A47F 13/06; A47F 13/08; B25J 1/04; B25F 1/00; B26B 11/00
USPC ................ 294/24, 210; 7/158, 161
See application file for complete search history.

(56) References Cited

U.S. PATENT DOCUMENTS

| | | | | |
|---|---|---|---|---|
| 3,451,076 A | * | 6/1969 | Verne | B67B 7/10 D8/42 |
| 6,276,014 B1 | * | 8/2001 | Lee | B26B 5/001 30/162 |
| 7,490,880 B1 | * | 2/2009 | Matsui | A47F 13/06 294/210 |
| 7,530,131 B1 | * | 5/2009 | Conrique | B26B 5/00 7/164 |
| 8,051,518 B2 | * | 11/2011 | Massaro | B26B 11/00 407/29.15 |
| 10,486,301 B2 | * | 11/2019 | Taylor | A47F 13/08 |
| 2004/0100109 A1 | * | 5/2004 | Johnson | B25J 1/04 294/210 |
| 2012/0237330 A1 | * | 9/2012 | Wensman | A47F 13/08 414/800 |

OTHER PUBLICATIONS

Amazon.com [online], "Grabber Reacher Tool for Elderly, 32" Foldable Picker Upper Grabber, Long Handy Mobility Aids, Reaching Assist Tool for Trash Claw Pick up, Litter Picker, Garden Nabber, Arm Extension (Mazarine2)," Sep. 10, 2018, retrieved on Oct. 29, 2020, retrieved from URL <https://www.amazon.com/Foldable-Mobility-Reaching-Extension-Mazarine2/dp/B07GtWWjb5/ref=sr_1_1?dchild=1&keywords=grabber+claw&qid=1604001841&sr=8-1>, 6 pages.

Amazon.com [online], "Plumbing Grabber Sink Grabber Flexible Claw Pickup Tool for Litter Pick, Drains, Home Sink, Toilet & Clean Dryer Vents (24inch)," Aug. 24, 2020, Retrieved on Oct. 29, 2020, retrieved from URL <https://www.amazon.com/Plumbing-Grabber-Flexible-Pickup-Litter/dp/B08GKGD5L6/ref=sr_1_8?dchild=1&keywords=grabber+claw&qid=1604001878&sr=8-8>, 5 pages.

Amazon.com [online], "REXBETI 4-Pack Utility knife with Extra 10 Blades, Industrial Grade Heavy Duty Retractable Box Cutter for Cartons, Cardboard and Boxes, Ultra Sharp Black Blade, Blade Storage Design," Nov. 13, 2019, retrieved on Oct. 29, 2020, retrieved from URL <https://www.amazon.com/dp/B081GD4WVX/ref=sspa_dk_detail_5?psc=1&pd_rd_i=B081GD4WVX&pd_rd_w-BPTTV&pf_rd_p-f0355a48-7e73-489a-9590-564e12837b93&pd_rd_wg=S5yrM&pf_rd_r=66Z1A8FG1YN1EHX0ZRN&pd_rd_r=4adf3bce-f79a-4dde-b9f8-e6d5eeb2f003&spLa=ZW5jcn1wdGVkU XVhbG1maWVyPUFKW1k0QzFBS0RTT0MmZW5jcn1wdGVkS WQ9QTAxNTY3MjIyUFVBQU1IME42R0Y1JmVuY3J5cHRlZE FkSWQ9QTAwMTU3Mj AxWjNQRFAzWFZHS0NaJndpZGd1dE 5hbWU9c3BfZGV0YW1sX3RoZW1hdGljJmFjdG1vbj1jbGlja1J1 ZGlyZWN0JmRvTm90TG9nQ2xpY2s9dHJ1ZQ>, 6 pages.

(Continued)

*Primary Examiner* — Dean J Kramer

(74) *Attorney, Agent, or Firm* — Fish & Richardson P.C.

(57) ABSTRACT

This disclosure relates to a multi-functional merchandiser device, and more particularly to a handheld multi-functional tool and its method of use. In particular implementations, the improved merchandiser device may comprise multiple end effectors for a set of distinct merchandising operations.

20 Claims, 3 Drawing Sheets

(56) References Cited

OTHER PUBLICATIONS

Amazon.com [online], "WORKPRO Retractable Utility Knife and Self-retracting Safety Box Cutter 2-in-l with 2 Extra Blades Included," Sep. 24, 2015 retrieved on Oct. 29, 2020, retrieved from URL <https://www.amazon.com/WORKPRO-Retractable-Utility-Self-retracting-Included/dp/B015R4LD2M/ref=cm_cr_arp_d_product_top?ie=UTF8>, 6 pages.

* cited by examiner

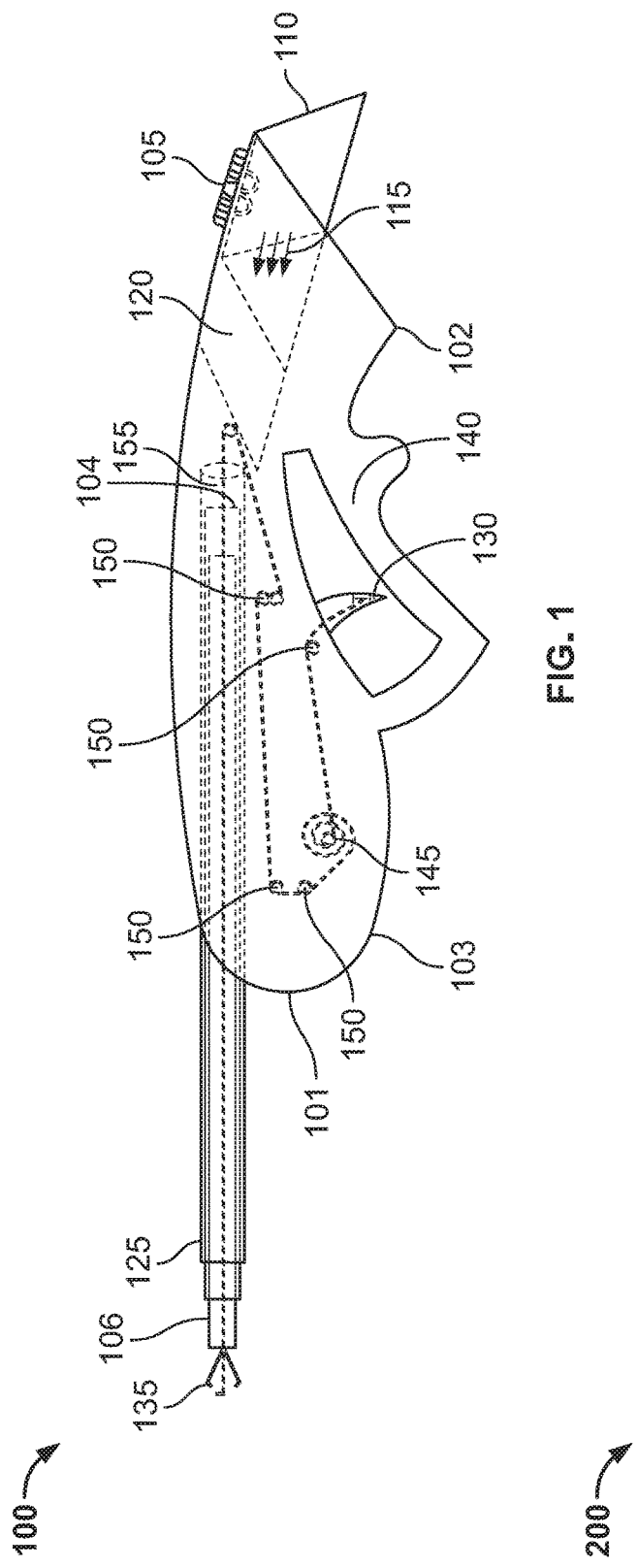

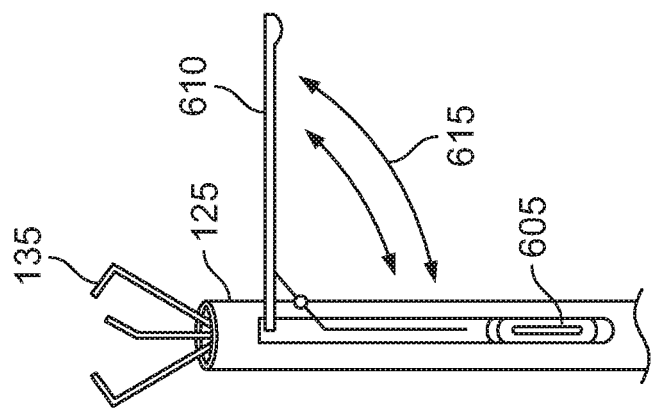
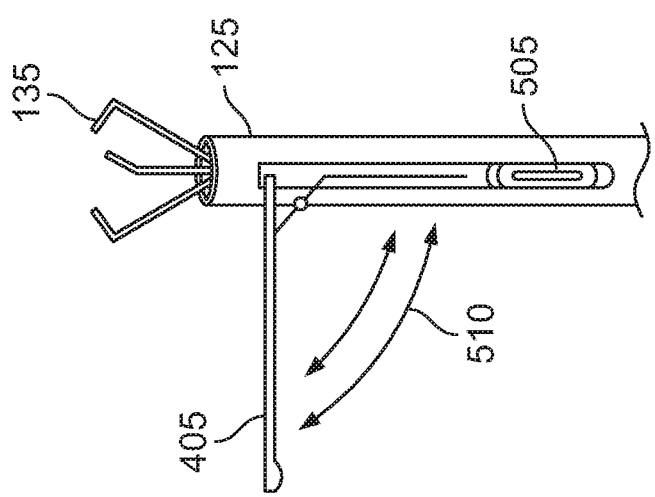
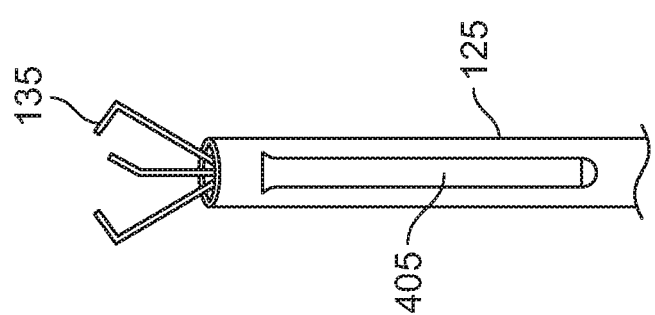
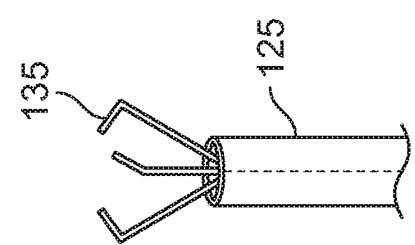

MERCHANDISER DEVICE AND METHOD

TECHNICAL FIELD

This disclosure relates to a multi-functional merchandiser device, and more particularly to a handheld multi-functional tool and its method of use.

BACKGROUND

Product merchandisers are responsible for providing various stores with consumer goods, such as for example, stocking grocery or convenience stores. The job responsibilities of a product merchandiser may include setting up product displays and in-store advertisements as well as stocking shelfs. Stocking shelfs may require a number of tasks, such as placing new product on the shelfs or organizing the products to occupy a minimum of space or to prominently display certain features of the product. A product merchandiser may also be tasked with organizing the consumer goods according to a particular inventory method or strategy, such as a "first in first out" stocking strategy that places the oldest products at the front of the shelf so that they are likely to be among the first goods of that type purchased by a consumer. Product merchandisers may be employed to work within one particular store location, but often product merchandisers are contractors employed to stock a designated product (e.g., of particular brand of products) at a number of different stores within a sales region or other designated geographic area. In such cases, the product merchandisers will travel from store to store to properly stock each store's shelf with the particular brand of products according to a predetermined product display type, and in doing so, may be compensated depending on their productivity (e.g., number of stores stocked or amount of product stocked), rather than on an hourly basis.

The job responsibilities of a product merchandiser, such as stocking shelfs, often require the merchandiser to carry and use of multiple different tools of different sizes to accomplish distinct functions performed in each store. For example, a product merchandiser may need to use an actuatable cutter or other cutting tool to open product packaging, or to open advertising materials. Conventional actuatable cutters are often sold as "right hand" or "left hand" operable, requiring a store or merchandising company to purchase multiple sets of tools to provide for right- and left-handed workers. In another example, product merchandisers may also use a number of other tools to stock products on shelfs, which may require a product merchandiser to carry distinct tools for gripping at a distance, for aligning rows of products, and other functions. For instance, some product merchandisers may carry a long gripping tool to reach an older product that has been pushed far back on a shelf or is located on a shelf above head level. Conventional gripping tools often have fixed elongated bodies (e.g., more than 18 inches in length) that are not designed for ergonomic or hands-free transport within a store or between stores (such as, for example, on a product merchandiser's tool belt). It is also often necessary for a product merchandiser to align products on a store shelf such that they are straight or otherwise in an aesthetically selected alignment. To accomplish this, a product merchandiser may carry a lengthy straight-edged tool (e.g., a yard stick), or rely on less exact methods such as using a straight edge of a discarded box, which can lead to less accurate or less aesthetic product placement.

The various responsibilities of a product merchandiser thus require the merchandiser to carry a number of different tools from location to location. This collection of distinct tools are often bulky and less convenient for transport to several locations during a working shift, and some of those conventional tools may be specialized to a particular user (e.g., right-hand only devices). Further, if a product merchandiser tasks require repeatedly switching between tools, such a collection of distinct tools may extend the amount of time required for any given project, thereby decreasing the efficiency of the product merchandiser. Finally, if a product merchandiser's tasks require repeated bending down for purposes of reaching and switching between different tools within the collection, such repeated body movements may increase the fatigue and strain on the product merchandiser's body, which can increase the likelihood of the onset of chronic pain or other work place injuries.

SUMMARY

Some embodiments described herein include an improved merchandiser device actuatable by a single hand to accomplish multiple different functions while also providing a form factor that is compact and designed to be ergonomically transported, for example, on a product merchandiser's tool belt. In particular implementations, the improved merchandiser device may comprise multiple end effectors for a set of distinct merchandising operations, thereby providing a handheld multi-functional tool for a merchandiser to conveniently carry and to increase efficiency. For example, the multiple end effectors may optionally include some or all of movable graspers, an actuatable cutter for opening boxes of consumer goods, and an extendable arm for aligning product on store shelves. In optional embodiments, the extendable arm may be automatically extendable responsive to a trigger actuator on a handheld body of the merchandiser device.

In particular embodiments, the end effector in the form of the movable graspers of the merchandiser device may include tongs, prongs, or clips positioned on the end of the extendable arm. As such, the user can use the device to grab or grip products that may be on the top of shelves or at the back of a shelf to facilitate stocking or repositioning of the products. The tongs, prongs, or clips may optionally be actuatable to apply a gripping force by the same trigger that causes initial actuation of the extendable arm or, in other embodiments, by a distinct actuator (separate from the trigger of the extendable arm) on the merchandiser device.

Some embodiments of the merchandiser device may also include an end effector for engaging on-shelf products, such as an end effector having one or more actuatable beams located at an end of the extendable arm. The actuatable beams, for example, may rotate between a retracted position (e.g., flush with a sidewall of the extendable arm) and an operative position (e.g., extending laterally outward away from the sidewall of the extendable arm). These actuatable beams may be activated through the use of a slide actuator on the extendable arm, through a further action of the trigger on the merchandiser device, through an actuator of a distinct button or trigger on the merchandiser device. In optional embodiments, the beams can be selectively lockable in the operative position, and then pushed manually back into a flush position. In other implementations, the beams may be automatically retracted to the flush position by actuating the trigger on the merchandiser device or another button or trigger on the merchandiser device. Optionally, a product merchandiser may actuate these beams into the operative position to further assist in product alignment or access out of reach product or product in a compact space. In various embodiments described below, the merchandiser device may be provided with an ambidextrous configuration, such that the same device may equally be used by right- and left-handed users.

Particular embodiments described herein include a merchandiser tool having a handle body having a hand gripping portion, a first recess, and a second recess spaced apart from the first recess. Certain embodiments may also include a first end effector comprising a cutter slidable within the first recess of the handle body between a first position in which the cutter is entirely within the first recess and a second position in which a sharp portion of the cutter is extended outwardly from the first recess. Optionally, the merchandiser tool may have a second end effector comprising a retractable alignment arm that is spaced apart from the cutter and that has a fixed end housed within the second recess and a free end opposite from the fixed end, the retractable alignment arm being adjustable between a retracted position in which the free end is located at a first spacing from the cutter and an extended position in which the free end is spaced further apart from the cutter. In some embodiments, the merchandiser tool further includes a third end effector comprising a movable grasper positioned along the free end of the retractable alignment arm.

Some embodiments described herein include a method of using a merchandiser tool including the step of sliding a cutter of the handheld merchandiser device from a first position in which the cutter is entirely within a first recess in a handle body of the handheld merchandiser device to a second position in which a sharp portion of the cutter is extended outwardly from the first recess. The method may further include the step of opening a container of products using the sharp portion of the cutter and retracting the cutter into the first recess. In some embodiments, the method may include the step of aligning the products on the shelf using a retractable alignment arm that is spaced apart from the cutter and that has a fixed end housed within a second recess in the handle body and a free end opposite from the fixed end, the retractable alignment arm being adjustable between a retracted position in which the free end is located at a first spacing from the cutter and an extended position in which the free end is spaced further apart from the cutter. Optionally, the method may comprise the step of actuating a movable grasper positioned along the free end of the retractable alignment arm.

A number of embodiments described herein may provide one or more of the following advantages. Some embodiments provide a compact merchandiser device that provides a handheld multi-functional tool with a number of useful end effectors, including optionally a cutter element such as an actuatable cutter, an extendable alignment tool, a gripper element (e.g., tongs or grip arms), and actuator beam elements (which may be positioned along on the extendable alignment tool). As such, the merchandiser device can advantageously provide a set of functional instruments conveniently used by a product merchandiser in a compact, single-hand tool body that may be attached to or carried in a hands-free manner (e.g., on a tool belt, in a single clothing pocket, or the like) or otherwise ergonomically transported and used at different store locations and job sites. Additionally, some embodiments of the merchandiser device can be configured to provide multi-functional benefits while also decrease the amount of bending and reaching experienced by product merchandisers, thereby reducing the likelihood of an injury, strain, or chronic pain from the repeated movements of a product merchandiser. Furthermore, some embodiments of the merchandiser device may also allow a product merchandiser to complete their work at a store location in a more efficient manner, and may also achieve location-to-location transport with increased efficiency. Finally, some embodiments of the merchandiser device described herein can be configured for ambidextrous use, such that a store or merchandising company would not need to buy multiple tools specific to different hand-dominant product merchandisers or employees.

The details of one or more embodiments are set forth in the accompanying drawings and the description below. Other features, objects, and advantages will be apparent from the description and drawings, and from the claims.

DESCRIPTION OF DRAWINGS

FIG. 1 shows a side view of an embodiment of an improved merchandiser device.

FIG. 2 shows a side view of an alternative embodiment of an improved merchandiser device.

FIG. 3 shows a perspective view of a portion of the improved merchandiser device, in accordance with the embodiments of FIGS. 1 and 2.

FIG. 4 shows a perspective view of an alternative embodiment of the portion of the improved merchandiser device of FIG. 3.

FIG. 5 shows a perspective view of an alternative embodiment of the portion of the improved merchandiser device of FIG. 3.

FIG. 6 shows another perspective view of the portion of the improved merchandiser device shown in FIG. 5.

Like reference symbols in the various drawings indicate like elements.

DETAILED DESCRIPTION

Figure 7:
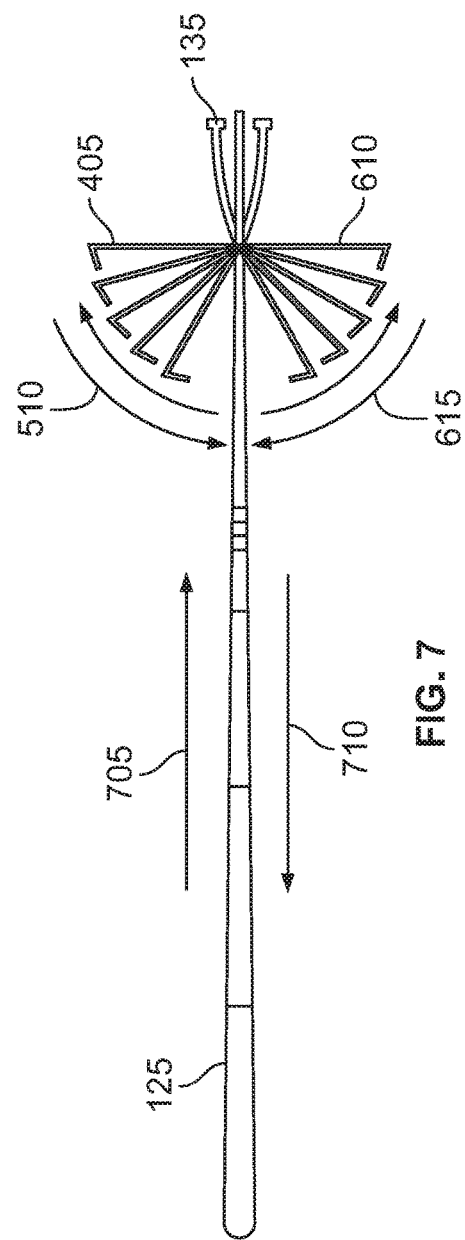
FIG. 7 shows a perspective view of a portion of the improved merchandiser device, in accordance with the embodiments of FIGS. 1 and 2.
Figure 8:
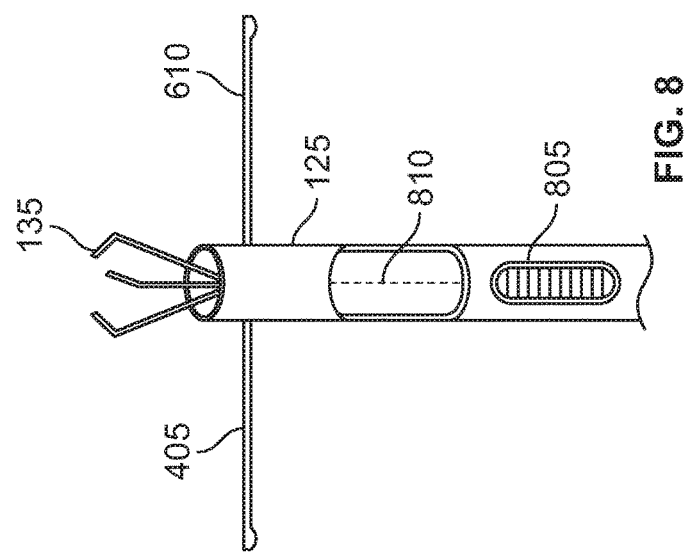
FIG. 8 shows a perspective view of an alternative embodiment of the portion of the improved merchandiser device of FIGS. 5 and 6.

Referring now to FIG. 1, some embodiments of a merchandiser device 100 include a body 101 structured to be held and controlled by a single hand of a user, such as a product merchandiser. As shown in FIG. 1, body 101 may include a hand gripping portion 140 located between a proximal end 102 and distal end 103 of body 101. In certain embodiments, hand gripping portion 140 is configured to be operable in a single hand of both right-handed and left-handed users. In such embodiments, hand gripping portion 140 may, for example, comprise symmetrical gripping surfaces configured to be gripped by either a right or left hand. As can be further seen in FIG. 1, hand gripping portion 140 may include surfaces and cavities such that the user can orient the device with the proximal end facing the user, or with the proximal end facing away from the user, depending on which tools of the device the user selects to use at the time. To facilitate ambidextrous use, certain embodiments of merchandiser tool 100 may be symmetrically designed (e.g., trigger 130 is centrally located).

As further shown in FIG. 1, particular embodiments of merchandiser device 100 may further include multiple end effectors 110, 125, and 135 (and optionally 405 and 610) configured to achieve distinct merchandising operations performed by a product merchandiser in use, thereby providing the form factor of a handheld multi-functional tool for the product merchandiser to conveniently carry and to increase the user's efficiency. For example, the device 100 may include a first end effector in the form of a cutter implement 110 configured to selectively extend from the proximal end of body 101. In the depicted embodiments, cutter implement 110 comprises a razor blade. In other embodiments, other sharp edged cutter devices may be used instead of or in addition to a razor blade. Optionally, cutter implement 110 may be slidable between an extended position and a retracted position, as indicated by arrows 115. In the retracted position, cutter implement 110 may rest within an internal cavity 120 in body 101 so that cutter implement 110 is fully retained inside of body 101 and thereby reduces the likelihood of inadvertently injuring the user during periods of nonuse. In some embodiments, cutter implement 110 may be slidable between the extended and retracted position through the use of slider actuator 105 accessible to a user's thumb or finger while the body 101 is held in a single hand of the user. In some embodiments, slider 105 may be configured to be releasably attached to cutter implement 110, such that cutter implement 110 may be replaced if it becomes worn or damaged.

Additionally, in some embodiments, merchandiser device 100 may also include a second end effector in the form of a retractable alignment arm 125 that can be configured to selectively extend from (and retract into) the body 101. In the embodiment depicted in FIG. 1, the retractable alignment arm is positioned to extend longitudinally from the distal end of the body 101 (e.g., extending from the opposite end of the body from which the cutter implement 110 is housed). The retractable alignment arm 125 has a fixed end 104 (at least a portion of which is positioned within the body) and a free end 106 configured to extend outwardly from the body 101. As shown in FIG. 1, the fixed end 104 of retractable alignment arm 125 may be partially located within a cavity 155 in body 101 and can extend away from the cutter implement 110 in a longitudinal direction toward the free end 106 so that the retractable alignment arm 125 has a central axis along its extendable length that is parallel to a central plane of the body 101 (a plane that extends through the proximal end 102 and distal end 103 of the body 101 parallel to the page of FIG. 1). In certain embodiments, retractable alignment arm 125 is slidable between a retracted arm position, and an extended arm position. For example, as described in more detail below in connection with FIG. 7, for example, retractable alignment arm 125 is shown in the extended position, with arrows 705 and 710 shown the extension and retraction directions of retractable alignment arm 125, respectively. In FIG. 1, retractable alignment arm is shown in the retracted position, partially extending from the distal end 103 of body 101 such that the free end 106 of the retractable alignment arm 125 is viewable. In other embodiments, when retractable alignment arm 125 is in the retracted position it may be entirely recessed within cavity 155 in body 101.

In some embodiments, retractable alignment arm 125 may be transitioned between the retracted position and extended position by actuating trigger 130. As shown in FIG. 1, the device 100 can include an actuator in the form of a trigger 130, which is mechanically coupled with the retractable alignment arm 125 in a manner that urges the retractable alignment arm 125 to shift to the extended position in response to actuation of the trigger 130. In one example, the trigger 130 is mechanically connected to retractable alignment arm 125 at least one spring element, such as a coil spring 145 housed within the body 101. In some embodiments, when trigger 130 is actuated, it releases the stored tension in coil spring 145, thereby causing the spring 145 to act upon the retractable alignment arm 125 and urge the retractable alignment arm 125 to transition away from the retracted position toward the extended position. As further shown in FIG. 1, coil spring 145 may be mechanically connected to retractable alignment arm 125 through one or more spindles 150 housed within the body 101. In other embodiments, retractable alignment arm 125 may be manually slidable between the retracted and extended positions. In those circumstances, the device 100 can be configured without the spring member 145, and the device 101 can optionally include the trigger 130 for purposes of locking the retractable alignment arm 125 in the retracted position until the user actuates the trigger 130 for purposes of unlocking it.

After the retractable alignment arm 125 reaches the extended position, the user can selectively operate the device 100 to return the retractable alignment arm 125 to the retracted position. In one example, the user may manually force the free end 106 of the retractable alignment arm 125 toward the body 101 until the retractable alignment arm 125 returns to the retracted position. In doing so, the force applied to the retractable alignment arm 125 may serve to recoil the spring 145 to store its potential energy, and when the retractable alignment arm 125 reaches its retracted position, a mechanical lock (e.g., a pawl or other structure that engages the trigger 130) can retain the spring 145 in its coiled state (stored potential energy) until subsequent actuation of trigger 130. In still other embodiments, the user may automatically slide retractable alignment arm 125 to the retracted position through actuation of trigger 130, such as, for example, to a second position that actuates another spring mechanism (not shown) housed within the body 101. Still referring to FIG. 1, in some embodiments retractable alignment arm 125 may comprise a series of nested tubes that slide relative to one another to extend or retract retractable alignment arm 125. In optional embodiments, the tubes of retractable alignment arm may be configured to twist and lock with one another at a variety of positions, such that the user may select a given extension length for retractable alignment arm 125 and twist the tubing to lock the retractable alignment arm at a desired point and length from body 101.

Referring now to FIG. 2, some alternative embodiments of a merchandiser device 200 can include an alternative configuration of a body 201 including an actuator button 205, which is described in detail below.

Referring now to FIGS. 1, 3, and 7, some embodiments of merchandiser device 100 may also include a third end effector in the form of a product grasper element (e.g., actuatable prongs 135 in the depicted embodiment), which can be positioned along the distal end of retractable alignment arm 125 for purposes of gripping targeted objects. The movable prongs 135 may be metallic, or they may be formed from a polymeric material. In still further embodiments, prongs 135 may be coated in an elastomeric material to reduce the likelihood of inadvertently scratching or damaging items that are engaged by the prongs 135 during use. As described in more detail below, the user can control the device 100 to actuate the prongs 135 to provide a gripping force. Optionally, prongs 135 may be actuated by further depressing the trigger 130 (e.g., the same trigger used to actuate the retractable alignment arm 125) after retractable alignment arm 125 is in the extended position. For example, prongs 135 may be mechanically connected to trigger 130 through coil spring 145, such that when retractable alignment arm 125 is extended, a further depression of trigger 130 with pull on the connected wire, causing prongs 135 to be pulled toward end 104 of retractable alignment arm 125. In such embodiments, prongs 135 may be wider than the end of retractable alignment arm 125, such that this retraction force causes the prong ends to be brought closer together.

Referring now to FIGS. 4-7, some embodiments of merchandiser device 100 may further include a fourth end effector in the form of one or more extendable beams 405/610, which can be actuated to extend laterally outward from the retractable alignment arm 125. As shown in FIGS. 4 and 5, for example, some embodiments of merchandiser device 100 may include the extendable beam 405 positioned along the distal end of retractable alignment arm 125 and configured to extend laterally outward from a sidewall of the retractable alignment arm 125. The extendable beam 405 may be moved between a closed position and a laterally extended position. In the example depicted in FIG. 4, in the closed position, it is in a position substantially parallel to the longitudinal axis of the retractable alignment arm 125. The user can operate the device 100 to actuated the extendable beam 405 so that it pivots to the laterally extended position, such as shown in FIG. 5, where extendable beam 405 is in a position substantially perpendicular to the longitudinal axis of the retractable alignment arm 125.

As indicated by arrows 510 in FIG. 5, extendable beam 405 may be pivoted back and forth between the closed and laterally extended positions, according to the user's actuation of the beam 405. Referring again to FIG. 5, in some embodiments extendable beam 405 may be held in the closed position by slider 505. In these embodiments, extendable beam 405 may have a tab or other portion that sits underneath slider 505 such that extendable beam 405 remains in the closed position during transportation or use until needed. A user may then operate slider 505 to release extendable beam to the extended or open position for use. In some embodiments, extendable beam 405 may further include a spring (not shown) that biases extendable beam 405 towards the open position, such that upon operation of slider 505 the spring force will bias extendable beam 405 into the open position. In other embodiments, the spring may be omitted and extendable beam 405 configured to slide and lock into the open position manually under application of a force from the user's finger. In such embodiments, slider 505 may be omitted, or may be include for purposes of selectively locking the extendable beam 405 in its closed position (FIG. 4).

Referring now to FIG. 6, some embodiments of merchandiser device 100 may further comprise a second extendable beam 610 (in addition to the beam 405 described above) that is selectively movable between a closed position (e.g., substantially parallel to the longitudinal axis of retractable alignment arm 125) and a laterally extended position (e.g., substantially perpendicular to the longitudinal axis of retractable alignment arm 125), as indicated by arrows 615 showing extendable beam 610 moving between the closed and open positions. Extendable beam 610 may be located on the opposite side of retractable alignment arm 125 from the first extendable beam 405 (e.g., 180-degree angular spacing), or may be positioned at other angular spacing locations relative to the first extendable beam 405. In still further embodiments, additional extendable beams (similar in shape and operation to means 405 and 610) at other positions on retractable alignment arm 125 may be used. As further shown in FIG. 6, extendable beam 610 may be held in the closed position by slider 605 in a manner similar to as described above in connection with extendable beam 405 and slider 505.

Referring now to FIG. 7, in other embodiments of the device 100, the beams 405 and 610 can be collectively actuated/retained together via a single actuator, such as a single slider 805 positioned along the retractable alignment arm 125. For example, the slide 805 can be adjusted by a user's finger to cause both extendable beams 405 and 610 to move simultaneously from the closed to the laterally extended position. In such embodiments, slider 805 is mechanically linked to both extendable beam 405 and extendable beam 610, for example, as indicated by line 810.

Referring now to FIG. 2, some alternative embodiments of a merchandiser device 200 can provide an alternative configuration for actuating the first beam 405 (or both the first and second beams 405 and 610). For example, the device 200 can include an alternative configuration of a body 201 include an actuator button 205. As indicated by arrow 210, in some embodiments button 210 is connected to extendable beam 405 (and optionally the second 610) on the distal end of retractable alignment arm 125 through a coil spring or similar structure. In these embodiments, a user may depress button 205 so as to cause one or both of extendable beams 405 and 610 to transition from the closed to open position. For example, extendable beams 405 and 610 may further include a spring (not shown) that biases extendable beam 405 towards the open position and a catch that holds extendable beams 405 and 610 in the closed position. A user may depress button 405 to actuate a coil spring connected to the catch and release it, thereby allowing the springs to bias extendable beams 405 and 610 to the open position. In certain embodiments, a user may further depress button 205 so as to transition extendable beams 405 and 610 back to the closed position.

In use, some embodiments of the merchandiser device 100 (or 200) can be used in a method for placing products on a shelf. For example, the method may include the step of opening a container of products using a cutter 110 of the handheld merchandiser device, by sliding the cutter 110 from a retracted to extended position with respect to a body of the handheld merchandiser device such that a sharp end of cutter 110 extends from the body and may be used to open the container. The method may further include retracting the cutter 110 into a recess in the body of the merchandising device, and then further removing products from the container of products and placing those products on a shelf. In some embodiments, the method may further include aligning the products on the shelf using a retractable alignment arm of the merchandiser device, wherein the retractable alignment arm is adjustable between a retracted position in which a free end is located at a first spacing from the cutter and an extended position in which the free end is spaced further apart from the cutter. In use, the retractable alignment arm may be adjusted to the extended position and placed along the products on the shelf in order to align the products in a selected orientation. The method may optionally further include rotating an extendable beam positioned along the free end of the retractable alignment arm from closed position that is substantially parallel with a longitudinal axis of the retractable alignment arm to a laterally extended position that is substantially perpendicular to the longitudinal axis of the retractable alignment arm in order to fine tune the alignment of products on the shelf or to retrieve misaligned products.

A number of embodiments have been described. Nevertheless, it will be understood that various modifications may be made without departing from the scope of the following claims.

What is claimed is:

1. A handheld merchandiser tool comprising:
   a handle body having a hand gripping portion, a first recess, and a second recess spaced apart from the first recess;
   a first end effector comprising a cutter slidable within the first recess of the handle body between a first position in which the cutter is entirely within the first recess and a second position in which a sharp portion of the cutter is extended outwardly from the first recess;
   a second end effector comprising a retractable alignment arm that is spaced apart from the cutter and that has a fixed end housed within the second recess and a free end opposite from the fixed end, the retractable alignment arm being adjustable between a retracted position in which the free end is located at a first spacing from the cutter and an extended position in which the free end is spaced further apart from the cutter; and
   a third end effector comprising a movable grasper positioned along the free end of the retractable alignment arm so that the movable grasper is movable relative to the free end of the second end effector.

2. The handheld merchandiser tool of claim 1, wherein the retractable alignment arm is manually extendable from the retracted position to the extended position.

3. The handheld merchandiser tool of claim 1, wherein the handle body has a proximal end and a distal end, wherein: the first recess that at least partially contains the cutter is located at the proximal end of the handle body, and the second recess that at least partially contains the retractable alignment arm is located at the distal end of the handle body.

4. The handheld merchandiser tool of claim 1, wherein the retractable alignment arm is further slidable to a third position; the third position between located between the first, retracted position and the second, extended position.

5. The handheld merchandiser tool of claim 1, wherein the handle body is a single-hand structure having an ambidextrous hand gripping portion.

6. A handheld merchandiser tool comprising:
   a handle body having a hand gripping portion, a first recess, and a second recess spaced apart from the first recess;
   a first end effector comprising a cutter slidable within the first recess of the handle body between a first position in which the cutter is entirely within the first recess and a second position in which a sharp portion of the cutter is extended outwardly from the first recess;
   a second end effector comprising a retractable alignment arm that is spaced apart from the cutter and that has a fixed end housed within the second recess and a free end opposite from the fixed end, the retractable alignment arm being adjustable between a retracted position in which the free end is located at a first spacing from the cutter and an extended position in which the free end is spaced further apart from the cutter;
   a third end effector comprising a movable grasper positioned along the free end of the retractable alignment arm; and
   a trigger adjacent to the hand gripping portion and being movable relative to the hand gripping portion to actuate the retractable alignment arm from the retracted position to the extended position.

7. The handheld merchandiser tool of claim 6, wherein the grasper is movable in response to actuation of the trigger relative to the hand gripping portion.

8. The handheld merchandiser tool of claim 6, further comprising a fourth end effector comprising at least one extendable beam positioned along the free end of the retractable alignment arm and being movable between a closed position that is substantially parallel with a longitudinal axis of the retractable alignment arm and a laterally extended position that is substantially perpendicular to the longitudinal axis of the retractable alignment arm.

9. The handheld merchandiser tool of claim 8, wherein the retractable alignment arm further comprises concentric tube elements that are slidable relative to one another for moving the extendable beam from the retracted position to the extended position.

10. The handheld merchandiser tool of claim 8, further comprising an actuatable portion movable relative to the handle body for driving the extendable beam from the closed position to the laterally extended position.

11. A method of using a handheld merchandiser device, comprising:
    sliding a cutter of the handheld merchandiser device from a first position in which the cutter is entirely within a first recess in a handle body of the handheld merchandiser device to a second position in which a sharp portion of the cutter is extended outwardly from the first recess;
    opening a container of products using the sharp portion of the cutter;
    retracting the cutter into the first recess; and
    aligning the products on a shelf using a retractable alignment arm that is spaced apart from the cutter and that has a fixed end housed within a second recess in the handle body and a free end opposite from the fixed end, the retractable alignment arm being adjustable between a retracted position in which the free end is located at a first spacing from the cutter and an extended position in which the free end is spaced further apart from the cutter;
    and actuating a movable grasper positioned along the free end of the retractable alignment arm so that the movable grasper moves relative to the free end of the retractable alignment arm.

12. The method of claim 11, wherein the step of aligning the products on the shelf further comprises extending the retractable alignment arm manually from the retracted position to the extended position.

13. The method of claim 11, wherein the handle body has a proximal end and a distal end, wherein: the first recess that at least partially contains the cutter is located at the proximal end of the handle body, and the second recess that at least partially contains the retractable alignment arm is located at the distal end of the handle body.

14. The method of claim 11, wherein the retractable alignment arm is further slidable to a third position; the third position between located between the first, retracted position and the second, extended position.

15. The method of claim 11, wherein the handle body is a single-hand structure having an ambidextrous hand gripping portion.

16. A method of using a handheld merchandiser device, comprising:
    sliding a cutter of the handheld merchandiser device from a first position in which the cutter is entirely within a first recess in a handle body of the handheld merchandiser device to a second position in which a sharp portion of the cutter is extended outwardly from the first recess;
    opening a container of products using the sharp portion of the cutter;
    retracting the cutter into the first recess; and aligning the products on a shelf using a retractable alignment arm that is spaced apart from the cutter and that has a fixed end housed within a second recess in the handle body and a free end opposite from the fixed end, the retractable alignment arm being adjustable between a retracted position in which the free end is located at a first spacing from the cutter and an extended position in which the free end is spaced further apart from the cutter;

actuating a movable grasper positioned along the free end of the retractable alignment arm; and wherein the step of aligning the products on the shelf further comprises actuating a trigger adjacent to a hand gripping portion of the handle body and being movable relative to the hand gripping portion to actuate the retractable alignment arm from the retracted position to the extended position.

17. The method of claim 16, wherein the step of aligning the products on the shelf further comprises moving the grasper in response to actuation of the trigger relative to the hand gripping portion.

18. The method of claim 16, further comprising the step of extending an end effector comprising at least one extendable beam positioned along the free end of the retractable alignment arm from a closed position that is substantially parallel with a longitudinal axis of the retractable alignment arm to a laterally extended position that is substantially perpendicular to the longitudinal axis of the retractable alignment arm.

19. The method of claim 18, wherein the retractable alignment arm further comprises concentric tube elements that are slidable relative to one another for moving the extendable beam from the retracted position to the extended position.

20. The method of claim 18, wherein the handle body comprises an actuatable portion movable relative to the handle body for driving the extendable beam from the closed position to the laterally extended position.

* * * * *